United States Patent [19]

Kleiber

[11] Patent Number: 5,130,716

[45] Date of Patent: Jul. 14, 1992

[54] APPARATUS FOR AND METHOD OF MONITORING A NAVIGATION SYSTEM

[75] Inventor: Herbert Kleiber, Ludwigsburg, Fed. Rep. of Germany

[73] Assignee: Standard Elektrik Lorenz Aktiengesellschaft, Fed. Rep. of Germany

[21] Appl. No.: 616,891

[22] Filed: Nov. 21, 1990

[30] Foreign Application Priority Data

Nov. 23, 1989 [DE] Fed. Rep. of Germany ....... 3938735

[51] Int. Cl.$^5$ .............................................. G01S 7/40
[52] U.S. Cl. .................................... 342/173; 342/408; 455/115
[58] Field of Search ................ 342/408, 173; 455/101, 455/103, 115

[56] References Cited

U.S. PATENT DOCUMENTS

| | | | |
|---|---|---|---|
| 3,085,245 | 4/1963 | Wilson et al. | 455/103 |
| 4,541,121 | 9/1985 | Blum | 455/115 |
| 4,940,984 | 7/1990 | Kleiber | 342/173 |

OTHER PUBLICATIONS

Peter J. Wroblewski, Development of Continuity of Service Requirements for the Microwave Landing System (MLS), Mitre Corp. Sep. 1987.

*Primary Examiner*—Theodore M. Blum

[57] ABSTRACT

Microwave landing systems are used to enable aircraft to make landings even in poor visibility. One distinguishes three categories of approach and landing manoeuvers. Of particular importance are Category III operations, i.e., those in which the pilot depends exclusively on the navigation system, because he cannot see the runway. Throughout a Category III landing operation, it must be ensured that the navigation system does not fail, and that the information contained in the signals being radiated by the navigation system is reliable. To that end, two executive monitors are arranged such that the first to detect a signal error functions as a master monitor. If the slave monitor then detects (within a reduced error threshold) the same signal error, an error in the system being monitored is confirmed and appropriate safety measures are taken (e.g. immediate changeover from the faulty transmitter). If the slave monitor does not detect the same signal error using the reduced error threshold, this confirms an error in the monitoring system, and other appropriate safety measures (e.g. orderly system shutdown) are taken.

8 Claims, 5 Drawing Sheets 5,130,716

APPARATUS FOR AND METHOD OF MONITORING A NAVIGATION SYSTEM

TECHNICAL FIELD

The present invention relates to an apparatus for and a method of monitoring navigation systems, particularly microwave landing systems.

CLAIM FOR PRIORITY

This application is based on and claims priority from an application first filed in Federal Republic of Germany on Nov. 23, 1989 under Ser. No. 39 38 735.6. To the extent such prior application may contain any additional information that might be of any assistance in the use and understanding of the invention claimed herein, it is hereby incorporated by reference.

BACKGROUND ART

Navigation systems, e.g., microwave landing systems, are used to enable aircraft to make landings even in poor visibility. One distinguishes three categories of approach and landing manoeuvres. These categories are described in an article by Peter J. Wroblewski, "Development of Continuity of Service Requirements for the Microwave Landing System", The MITRE Corporation, MTR 86W243, Sep. 1987, on pages 2-1 and 2-2. Of particular importance are Category III operations, i.e., those in which the pilot depends exclusively on the navigation system, because he cannot see the runway. Throughout a Category III landing operation, it must be ensured that the navigation system does not fail, and that the information contained in the signals being radiated by the navigation system is reliable. The first-mentioned requirement is referred to as "continuity of service", and the second as "integrity".

To meet both requirements, i.e., to achieve high integrity and high continuity of service (COS), the navigation system includes redundant equipment. In addition, the signals radiated by the navigation system are monitored by two or more, generally two, monitors. The two monitors are executive monitors, i.e., monitors which initiate changeover or shutdown operations on the occurrence of an error in the radiated signals. In the prior art monitoring apparatus, monitors with identical sequences of operations are used, and a check is made to determine whether both monitors produce the same result. Such apparatus has the disadvantage that a fault in either of the monitors results in the two monitors indicating unequal results, so that the navigation system will be shut down. Thus, the COS is impaired by the use of two monitors with equal sequences of operation. Another drawback of the monitoring apparatus is apparent from the following. It may happen that the same fault occurs in both monitors at the same time. The outputs of both monitors then provide the same signals. In that case, an error in the signals being radiated by the navigation system can no longer be detected. The integrity of the system is thus impaired.

DISCLOSURE OF INVENTION

It is the object of the invention to provide an apparatus for and a method of monitoring a navigation system whereby both integrity and continuity of service are improved.

The apparatus according to the invention and the method according to the invention have the advantage that through the use of dissimilar redundant monitors, i.e., monitors with different sequences of operations, integrity and continuity of service are not impaired if monitors are faulty.

BRIEF DESCRIPTION OF DRAWINGS

An embodiment of the invention will now be explained in greater detail with reference to the accompanying drawings, in which.

BEST MODE FOR CARRYING OUT THE INVENTION

Figure 1:
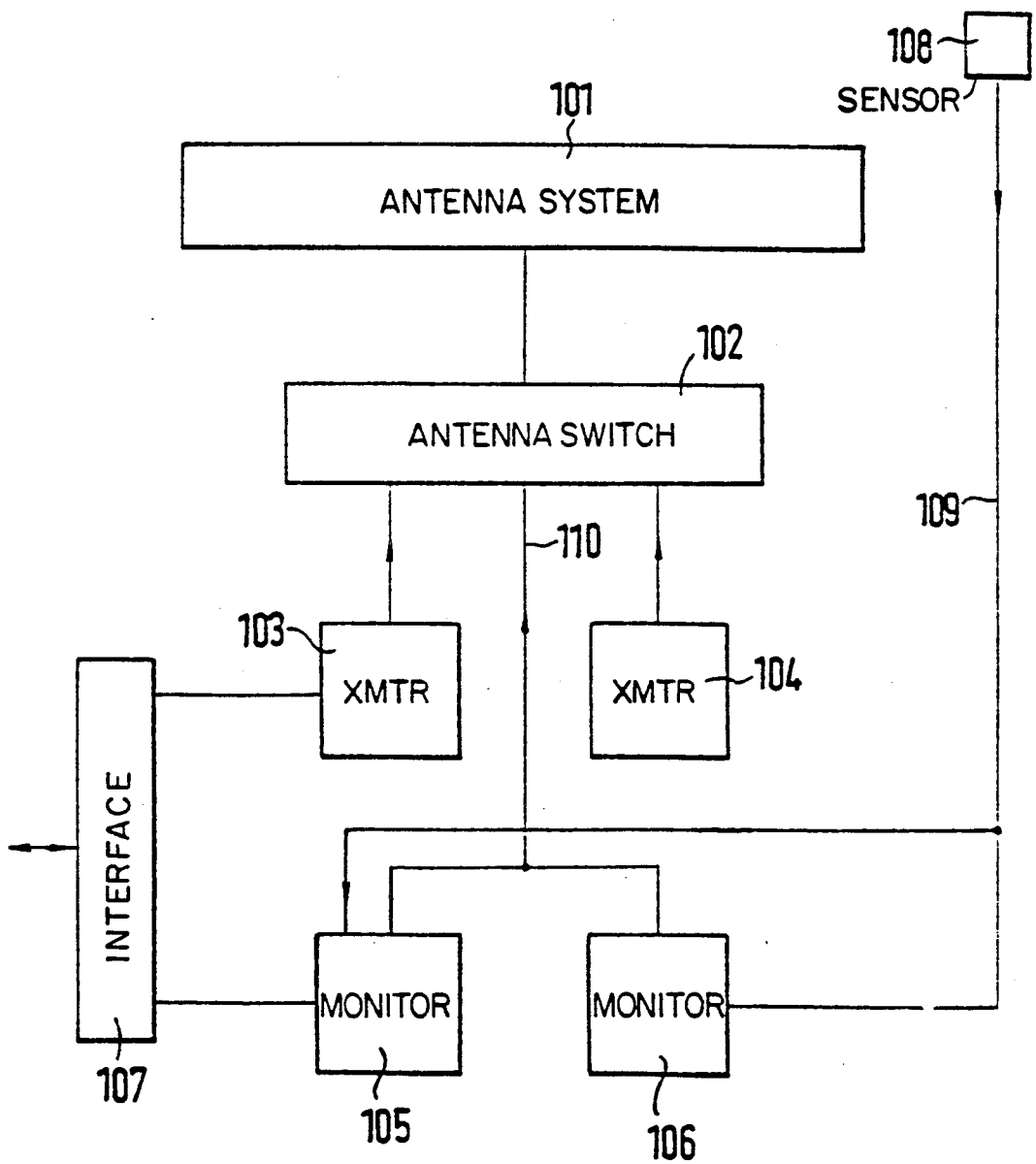
FIG. 1 shows the basic structure of a microwave landing system with two monitors.

In FIG. 1, the reference numeral 101 denotes an antenna system which can be supplied from two transmitters 103 and 104. Inserted between the antenna system 101 and the two transmitters is an antenna switch 102, which connects either the transmitter 103 or the transmitter 104 to the antenna system 101. The antenna system 101 is an electronically scanned array. The control of the antenna does not form part of the invention and will not be explained here. 105 is a first monitor, and 106 a second monitor. Both monitors receive signals from sensors 108 over a line 109. The sensors 108 monitor the signals radiated by the antenna system 101. The two monitors are connected via a line 110 to the antenna switch 102. As will be described later, the monitors are so-called executive monitors, i.e., monitors with which changeover from a faulty transmitter to a correctly functioning transmitter is possible, and which can even shut down the entire system. 107 is an interface whose functions include providing a connection between the air traffic controllers and the monitors 105 and 106.

Figure 4A:
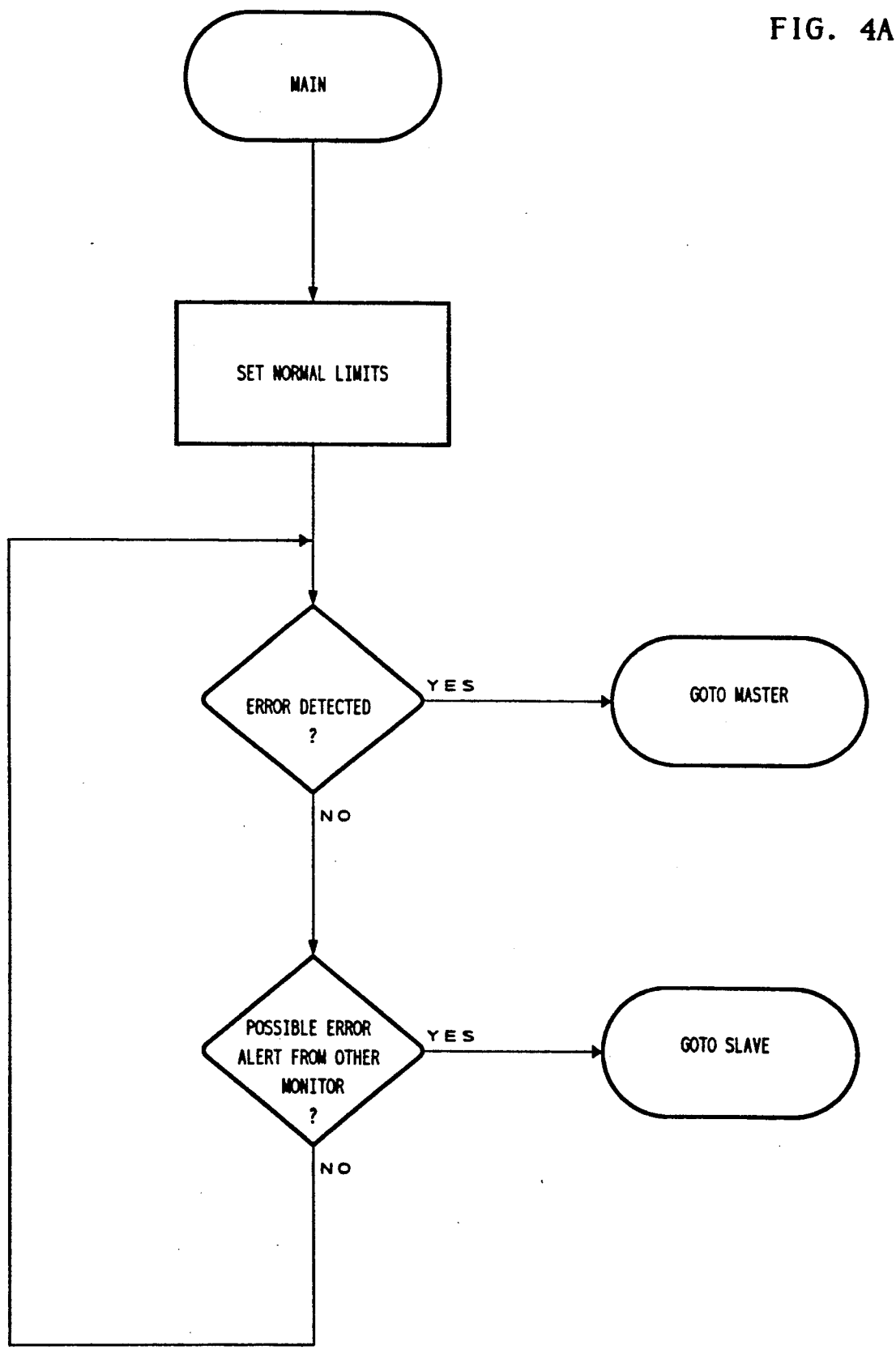
FIG. 4 (comprising FIGS. 4A, 4B and 4C) is a functional flowchart showing the functions of the two monitors.
Figure 4B:
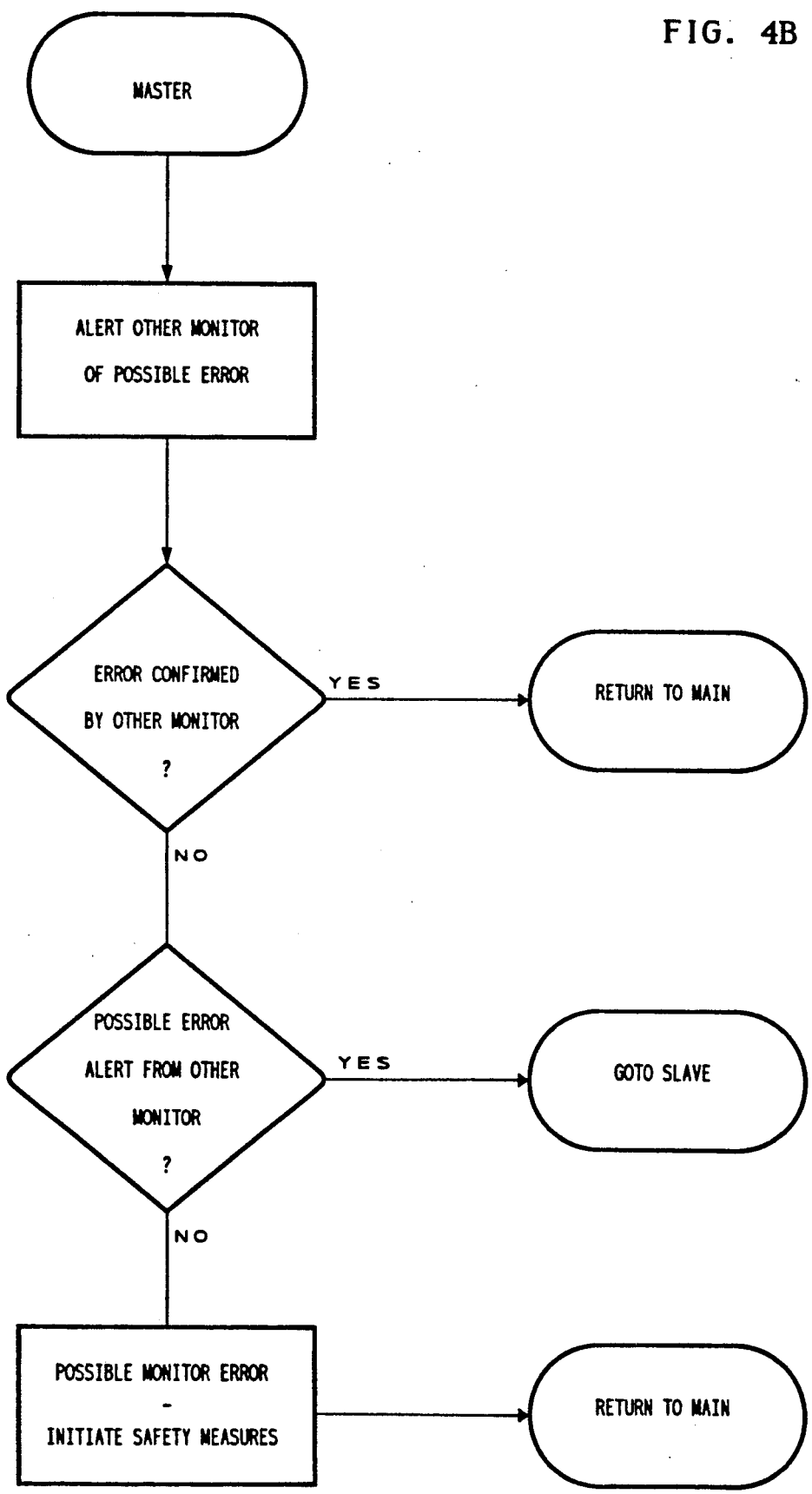
Figure 4C:
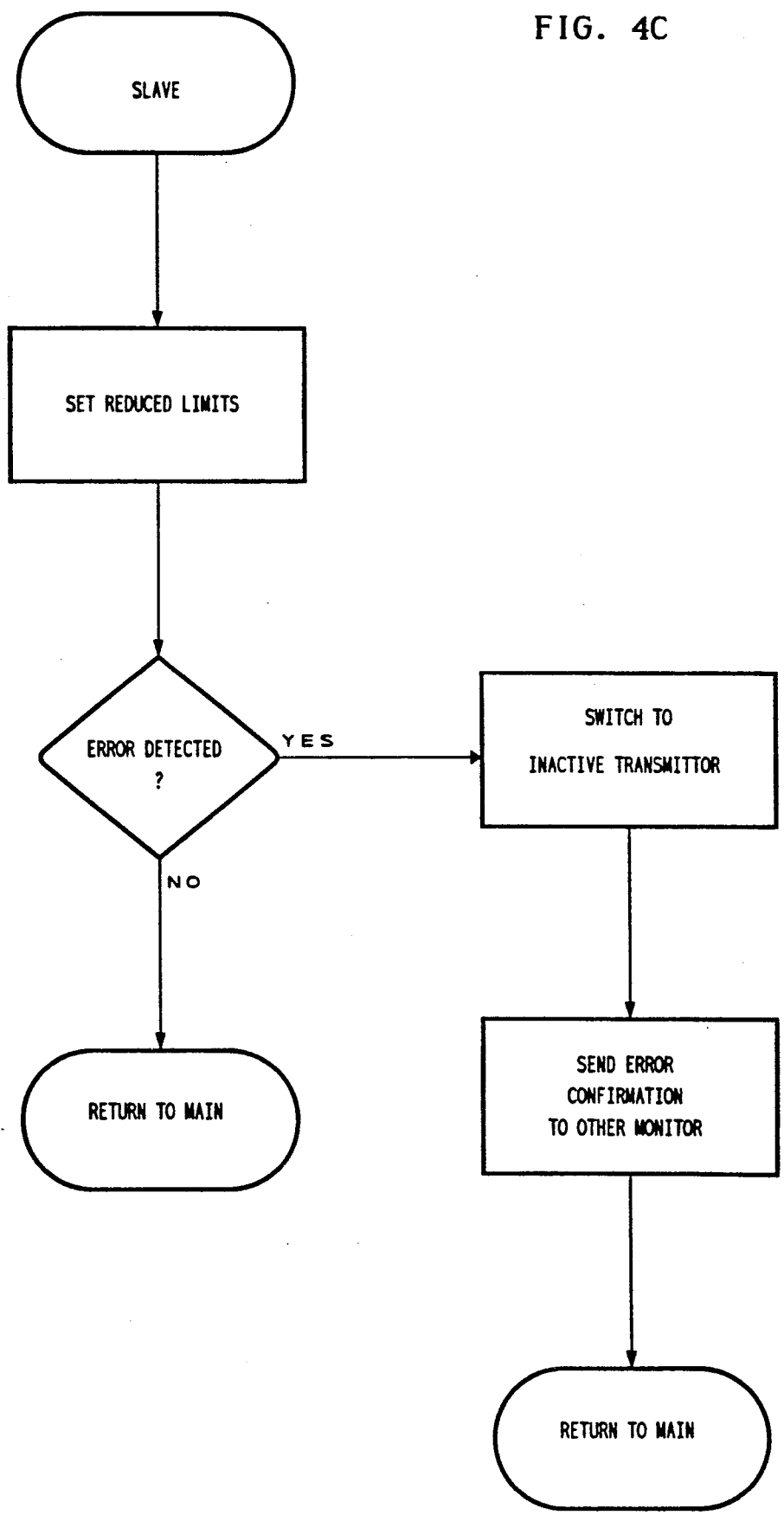

The two monitors work as follows. (Refer also to FIG. 4A which shows the normal operation of the monitors in the form of a simple Main loop, FIG. 4B which shows the Master function and FIG. 4C which shows the Slave function).

The first of the two monitors 105 and 106 to detect an error in the signals being radiated by the antenna system 110 is assigned the function of a master monitor. It notifies the detected error to the co-monitor, which thus becomes the slave monitor. The slave monitor now checks whether it can detect an error in the signals being radiated by the antenna system. During that time, the master monitor does not initiate or perform any changeover or shutdown operations. If the slave monitor detects the error, too, it will switch from one transmitter to the other. If the error is not detected by the slave monitor, the master monitor will shut down the navigation system at the end of a complete evaluation cycle, thus bringing the system to a safe condition.

The monitors 105 and 106 compare the radiated signals and signal parameters with fixed alarm limits. For the operation of the overall system, it is therefore extremely important that the monitors themselves are operating correctly. To this end, the monitors are monitored at given time intervals with the aid of a test signal generator.

Figure 2:
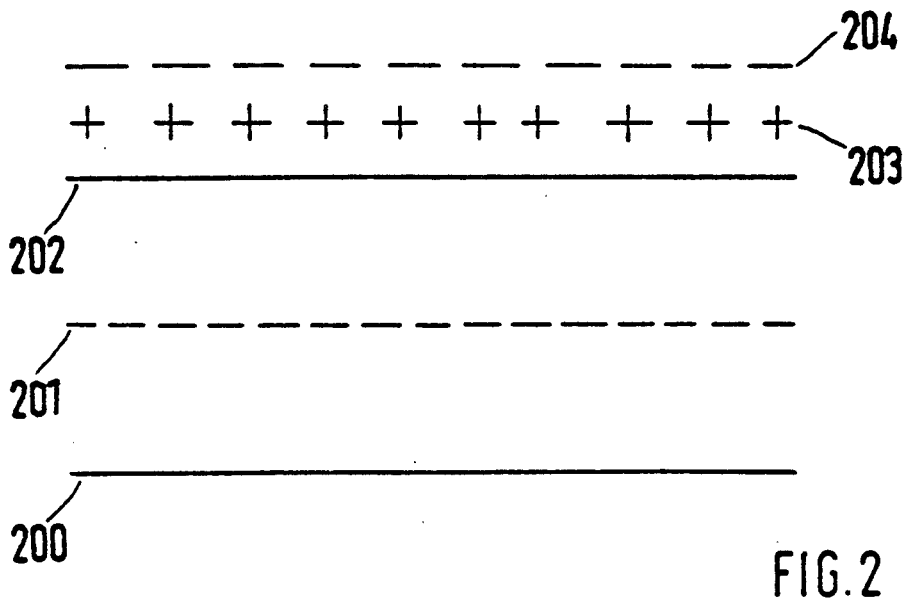
FIG. 2 shows a test-signal-generator-signal value and alarm limits.

In FIG. 2, 200 is a lower alarm limit, 201 a nominal value, 202 an upper alarm limit, 203 a test-signal-generator-signal value, and 204 a verification limit. With the aid of the signal from the test generator, a check can now be made to determine whether the monitor is detecting an erroneous signal, i.e., a signal lying above the upper alarm limit, and causing an alarm. With the aid of the verification limit 204, the measurement accuracy of the monitor is included in the signal check.

In either of the monitors is found to be faulty, a monitor-fault flag will be set. The monitor operating correctly then performs the monitoring function along. If this monitor is subsequently found to be faulty, too, the navigation system will be shut down by monitor independent equipment.

If only simultaneous alarm indications of both correctly functioning monitors are to result in a changeover, and if a transmitter shutdown is to be initiated in case of unequal monitor indications, a further alarm check must be introduced. The reason for this lies in those radiated signals whose measured values lie in the immediate vicinity of the alarm limit. Thus it may happen that one of the monitors is indicating an alarm while the other, because of measurement tolerances, has not yet detected the alarm condition.

Figure 3:
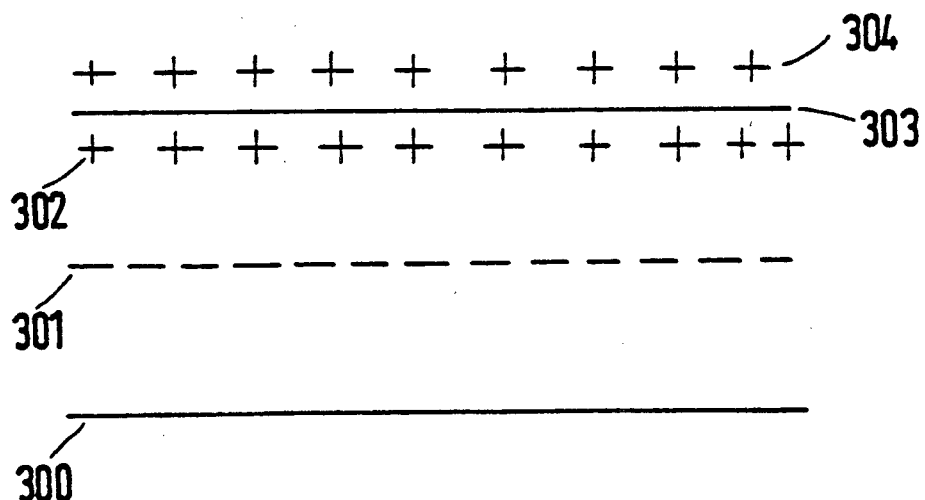
FIG. 3 shows values measured by monitors 1 and 2 and alarm limits.

This situation is illustrated in FIG. 3. The reference numeral 300 denotes a lower alarm limit, 301 a nominal value, 302 a value measured by monitor 2, 303 an upper alarm limit, and 304 a value measured by monitor 1. Monitor 1 has thus detected that the alarm limit was exceeded, in other words, that the signal radiated by the antenna system is erroneous. To prevent a shutdown of the entire system because of unequal monitor indications, which would be tantamount to a reduction of the continuity of service, a reduced alarm limit is introduced. The reduced alarm limit is the upper alarm limit reduced by a given factor, e.g., 90% of the upper alarm limit. If the first monitor now detects an alarm condition, and the second monitor detects a signal lying above the reduced alarm limit, the second monitor, i.e., the slave monitor will switch from one transmitter to the other. This ensures that tolerance-induced differences between the indications of the two monitors do not always lead to a shutdown of the entire navigation system.

The alarm limits used in the monitors are programmable. To enhance the integrity of the system, the programmed alarm limits are automatically checked at regular intervals. It goes without saying that a change of the alarm limits in the monitors may be made only in the so-called bypass mode, i.e., when the navigation system is not used to provide guidance for aircraft. Furthermore, steps must be taken to ensure that no alarm limits are programmed which result in malfunctions and, thus, in possible disasters during operation of the navigation system.

I claim:

1. Monitoring apparatus for a navigation system transmitting navigation signals, the monitoring apparatus comprising:

two monitors for detecting whether signals transmitted by the navigation system are outside programmable alarm limits, and means, associated with said monitors and responsive to the detection of a suspected signal error outside an initial alarm limit by either of the monitors, for designating a monitor detecting a suspected signal error as a master monitor which in turn causes the other monitor to be designated as a slave monitor, wherein the slave monitor utilizes a reduced alarm limit in which any signal error outside the initial alarm limit is also outside the reduced alarm limit, the master monitor initiates a first set of predetermined safety measures if the slave monitor does not detect a verifying signal error that is outside the reduced alarm limit, and in response to the detection of a verifying signal error by the slave monitor outside the reduced alarm limit, a second set of predetermined safety measures is initiated that is different from said first set of predetermined safety measures.

2. A monitoring apparatus as claimed in claim 1, wherein the second set of predetermined safety measures comprises the step of: immediately switching an associated antenna system from a first transmitter to a second transmitter or from the second transmitter to the first transmitter.

3. A monitoring apparatus as claimed in claim 1, wherein the first set of predetermined safety measures comprises the step of:

shutting down the entire navigation system.

4. A monitoring apparatus as claimed in claim 1, wherein each of said monitors has a nominal alarm threshold and a reduced alarm threshold.

5. The monitoring apparatus of claim 1, wherein said navigation signals are microwave landing signals.

6. Method of operating monitoring apparatus for navigation systems wherein two monitors monitor signals transmitted by the navigation system by comparing them with a nominal and a reduced alarm threshold, in response to the detection of a signal error by either of the monitors, the monitors are assigned different functions, the first monitor to detect a signal error by determining that the nominal alarm threshold has been exceeded is designated as a master monitor, the master monitor designates the other monitor as a slave monitor, and when the slave monitor determines that the reduced alarm threshold has been exceeded, the slave monitor initiates a predetermined safety measure.

7. A method as claimed in claim 6, wherein the reduced alarm threshold is the nominal alarm threshold reduced by a predetermined factor.

8. A method as claimed in claim 6, wherein, if the monitor performing the master function detects a signal error which exceeds the nominal alarm threshold, but the slave monitor does not detect an equivalent signal error which exceeds the reduced alarm threshold, the navigation system is shut down by the master monitor.

* * * * *

UNITED STATES PATENT AND TRADEMARK OFFICE
CERTIFICATE OF CORRECTION

PATENT NO. : 5,130,716

DATED : July 14, 1992

INVENTOR(S) : Herbert Kleiber

It is certified that error appears in the above-identified patent and that said Letters Patent is hereby corrected as shown below:

Column 3, line 10, before "either" change "In" to -- If --.

Column 3, line 13, after "function" change "along" to -- alone --.

Signed and Sealed this

Twelfth Day of October, 1993

BRUCE LEHMAN

Attest:

Attesting Officer

Commissioner of Patents and Trademarks